United States Patent [19]

D'Antonio et al.

[11] 3,893,072

[45] July 1, 1975

[54] ERROR CORRECTION SYSTEM

[75] Inventors: Renato A. D'Antonio, North Attleboro, Mass.; Alejandro B. Marton, Barrington, R.I.

[73] Assignee: International Data Sciences, Inc., Providence, R.I.

[22] Filed: Aug. 3, 1973

[21] Appl. No.: 385,297

[52] U.S. Cl. .............. 340/146.1 BA; 340/146.1 BA

[51] Int. Cl. .......................... H04l 1/16; G08c 25/02

[58] Field of Search ............................ 340/146.1 BA

[56] References Cited

UNITED STATES PATENTS

| | | | |
|---|---|---|---|
| 2,903,514 | 9/1959 | Van Duuren | 340/146.1 BA |
| 2,997,540 | 8/1961 | Ertman et al. | 340/146.1 BA |
| 3,327,288 | 6/1967 | Webber | 340/146.1 BA |
| 3,344,408 | 9/1967 | Singer et al. | 235/92 ST |
| 3,475,723 | 10/1969 | Burton et al. | 340/146.1 BA |

*Primary Examiner*—Malcolm A. Morrison
*Assistant Examiner*—R. Stephen Dildine, Jr.
*Attorney, Agent, or Firm*—Salter & Michaelson

[57] ABSTRACT

An error correction system for correcting received erroneous data transmitted from one site of a data link and detected as being received erroneously at a second site of said data link, said error correction system having at each site an encoder for adding an error detecting code to data, a decoder for detecting the code and inserting an error correct signal in data being transmitted in the reverse direction from said second site upon detection of an error in received data at said second site, said decoder at each site also providing instructions at said site upon detection of the error correct signal to cause error injection as well as retransmission of the same data previously detected as being incorrect, the preferred embodiment also includes an elastic memory which acts as a speed converter for the Time Division Multiplexer input thereto. In addition, the preferred embodiment also includes the capability of injecting errors to refill the elastic memory as well as the capability of sending uncorrected data if the correcting capability of the system is exceeded.

13 Claims, 13 Drawing Figures

ERROR CORRECTION SYSTEM

BACKGROUND OF THE DISCLOSURE

This invention is directed to an error correction system and is more particularly directed to a new and improved error correction system suitable for use in conjunction with existing data communication links.

The error correction apparatus of this invention is normally installed at each end of a full duplex data communication link and is usually coupled between a high speed synchronous Modulator - Demodulator (MODEM) and a Time Division Multiplexer (TDM).

In the prior art, the principal type of error correction scheme used today is characterized as Forward Error Correction (FEC). In a FEC system, information containing data and redundancy is transmitted from a transmitting site to a receiving site where it is received. The information is then checked and reconstructed or corrected in accordance with the redundancy bits.

Error detecting and correcting techniques conventionally used in Forward Error Correction Systems are discussed in the text DIGITAL COMPUTER FUNDAMENTALS, Second Edition, by Thomas C. Bartee, McGraw-Hill Book Company of New York, as well as in the text ARITHMENTIC OPERATIONS in DIGITAL COMPUTERS by R. K. Richards, D. Van Nostrand Company, Inc., of Princeton, New Jersey.

While FEC systems have found wide use, the amount of redundancy bits required to correct various possible error patterns increases enormously in comparison to the amount of data transmitted as the error correction capability is expanded. Since increased redundancy means increased data link overhead costs a new and improved error correction system was needed to overcome the deficiences in FEC systems.

The new error correction system of this invention may be characterized as a Pseudo Forward Error Correction system (PFEC) because for all intents and purposes it has the outside general characteristics of an FEC system.

In both the FEC and PFEC systems the data flow from one terminal of the data link to the terminal at the other end of the data link is continuous and uninterruped and therefore the user can not readily distinguish between the operation of both types of error correction systems.

The PFEC system is far superior, however, since it can theorectically correct at a minimum of redundancy, twice or more the amount of error patterns.

In practice, the PFEC system corrects approximately 95 percent of all possible error patterns. The reason this is so, is that the PFEC system utilizes the transmitted redundancy (parity information) for only error detection. Error correction is accomplished by retransmitting the information from the transmitter site once an error has been detected at the receiver site. Forward Error Correction (FEC) systems, on the other hand, utilize the redundancy directly to accomplish error correction at the receiver. Thus, an FEC system can only correct those errors that do not exceed the capability of the redundancy.

As an example, consider a simple FEC system known as the Hamming single error correction system. This system can correct any single bit in error within an encoded block. (An n-bit encoded block is defined as r redundancy bits plus $n$-$r$ data bist where $2^r - 1 = n$.) Thus 3 parity bits plus 4 data bits comprise a 7-bit encoded block capable of correcting any single error within the 7 bits. If two or more errors occur, no errors will be corrected.

If, on the other hand in the PFEC system the 3 parity bits are utilized only for error detection, and errors are corrected through retransmission, all single, double and triple error patterns will be detected, and hence corrected by retransmission and in addition a large percentage of error patterns containing 4 or more errors will be detected and hence corrected.

Thus, for the same amount of redundancy, the PFEC system will correct a much larger class of errors than can be corrected utilizing standard Forward Error Correction techniques.

The retransmission type error correction system or PFEC of this invention is constructed to provide comparable error correction power and has additional advantages in that it utilizes less components than a comparable FEC system. The reason for this is that both systems must detect the errors before they can be corrected. The FEC system, however, must then locate the individual errors and then correct them at the receiving site, while the PFEC system bypasses the costly (in terms of hardward required) error location and correction procedure by sending a signal back to the transmitting site to cause it to once again send the information.

BRIEF DESCRIPTION OF THE DISCLOSURE

The disclosure provides a new and improved error correction scheme in which transmitted data is checked for errors and retransmitted again if errors in transmitted data as well as an error correct or request retransmission signal is detected.

The above operation is accomplished according to the following by a transmitter including an encoder and a receiver including a decoder located at each data terminal site 1 and site 2 of a full duplex error correction system according to the following encoder and decoder algorithms which are set forth by way of example for the encoder at site 1 and the decoder at site 2:

A. Encoder algorithm at data terminal site 1;

1. A first block of data (call it block A) is taken from the transmitter elastic memory at site 1 and encoded to generate parity bits. Thereafter the block of data A and the parity bits (hereinafter defined as the encoded block e.g., encoded block A) are transmitted from site 1 to the receiver decoder located at site 2. A second block of data (call it block B) is taken from the elastic memory at site 1 and similarly encoded to provide parity bits. This block B and parity bits (encoded block B) are also transmitted from site 1 to the receiver decoder at site 2.
2. If an ACK message sent from the encoder at terminal site 2 is detected by the decoder at terminal site 1 (meaning encoded block A as received at terminal site 2 is correct after a parity check) while data block B is being transmitted, then the redundancy bits portion of encoded block B are transmitted correctly. If a NACK message (meaning encoded block A is detected as incorrect by virtue of a parity check at terminal site 2) is received from the encoder at terminal site 2 while data block B is being transmitted, then the redundancy or parity portion encoded block B is transmitted incorrectly by inverting these redundancy bits. This in effect amounts to injecting an error into encoded block B;

3. If an ACK message was received from the encoder at terminal site 2 during the transmission of the second encoded block B then the third block of data C is taken from the encoder elastic memory and transmitted as an encoded block according to the procedures outlined in step 2;
4. If a NACK message was received from the encoder at terminal site 2 during the transmission of the second encoded block B, then a third block of data $A^1$ is taken from a storage shift register and transmitted with correct redundancy. The fourth block of data $B^1$ is also taken from said storage shift register thereafter but the redundancy portion is treated according to the procedure outlined in step 2. $A^1$ and $B^1$ represent data blocks A and B stored in a two block storage shift register (SR) and temporarily held for retransmission. As data is continuously transmitted, the data blocks in the SR are updated but always lag two transmitted data blocks behind.

B. Decoder algorithm at data terminal site 2:

The decoder operates according to the following algorithm;

1. If the first encoded block A is received with no error (after checking the redundancy bits sent with data block A with parity bits recalculated from block A), then an ACK message is sent back to the decoder at site 1 during reception of the next encoded block B. The data portion of the first encoded block A is passed on to the receiver elastic memory at site 2 during reception of encoded block B.
2. If the first encoded block a is received with an error, then a NACK message is sent back to the decoder at site 1 from the encoder at site 2 while the next encoded block B is being received. The data portion of this first encoded block A is discarded and not sent to the receiver elastic memory at site 2.
3. If the first encoded block A was received with no error, then the second encoded block B is examined for errors according to step 1.
4. If the first encoded block A was received with error, then the data portion of the second encoded block B is discarded. An ACK message, however, is sent back to the decoder at site 1 from the encoder at site 2 during reception of a third encoded block C by the decoder at site 2.
5. The third encoded block C is examined according to the procedures outlined in steps 1 and 2.

The encoder at site 2 and the decoder at site 1 operate according to the same algorithms as set forth above for the encoder at site 1 and the decoder at site 2.

In addition the error correction system includes meansn to temporarily bypass correction to provide for continuous flow of data in the event that the error correcting capability of the system is exceeded.

Correctable errors within the capability of the system of this invention includes random or burst errors such as due to channel noise or line dropouts.

DETAILED DESCRIPTION OF THE PREFERRED EMBODIMENT

Figure 1:
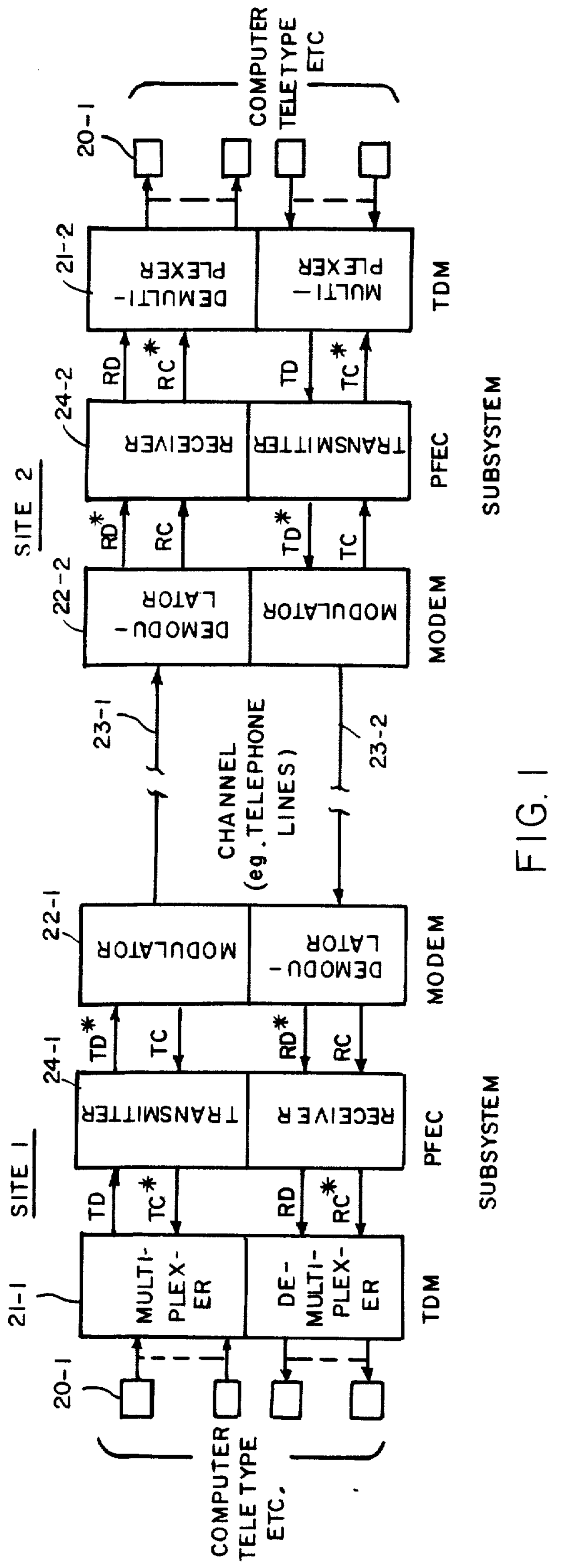
FIG. 1 is a block diagram illustrating a time division multiplexer data communication link including PFEC Subsystems.

In FIG. 1 there is disclosed a full duplex data communication link protected by the PFEC subsystems of this disclosure. Various input devices are shown at 20 at both terminal sites 1 and 2 and may include conventional computers, teletypes, tape systems or other conventional input devices all of which form no part of this invention and are only set forth for explanation purposes. It should be understood that site 1 and site 2 shown in FIG. 1 are usually physically separated from each other, as for example they may be in different cities and are connected together via telephone lines, microwave communications etc., shown by lines 23-1 and 23-2 representing communication channels.

At 21 at both site 1 and site 2 there is shown a Time Division Multiplexer (TDM) comprising multiplexer and demultiplexer sections. The Time Division Multiplexer which may be used with the PFEC subsystems of this invention are quite conventional in the art and are commercially available. In particular the TDM may be selected as the T-16 Timeplexer sold by TIMPLEX of Norwood, New Jersey.

Since the TDM selected forms no part of this disclosure, the exact TDM selected is a decision to be made by the user.

At 22 in FIG. 1 there is shown a Modulator - Demodulator commonly referred to as a MODEM which is used as part of the data communication link, one being at each site. The MODEM is quite conventional in the art and may be purchased from many suppliers such as International Communications Corporation of Miami, Fla. The Model 2200/24 MODEM available from International Communications Corporation capable of operating at 2400 bps may be used.

Each PFEC subsystem in effect acts as a data transmitter and receiver. The transmitter comprises an elastic memory i.e., first-in first-out buffer register (FIFO) which acts as a speed converter between the TDM and an encoding device (encoder) which formats or frames transmitted data (TD) from the multiplexer by implementing a code and then transmits the formated frame (TD*) (see FIG. 5) to the modulator. The TD* frame is sent over channels 23-1 and 23-2 beteen sites.

Transmit clock TC* is supplied to the TDM at a pulse rate slower than the MODEM clock TC but equal to the data throughput.

The receiver portion of the PFEC subsystem is composed of a decoder and an elastic memory (FIFO) the same as the one in the transmitter. The decoder recovers data (RD=received data) from the received encoded blocks and accepts or rejects it based on whether or not the encoded blocks contained any errors. Correct data is entered into the elastic memory (FIFO) which supplies uninterrupted data to the TDM demultiplexer.

Incorrect received data is rejected at site 2 and retransmission is requested by means of a retransmission code transmitted in the reverse channel 23-2 and added to the information being sent in the reverse direction. The retransmission code is recognized at the decoder at site 1 and causes the data received incorrectly at site 2 to be retransmitted from site 1 on the basis of an algorithm as previously described.

In FIG. 1 and the others following, TD represents the data block and TD* represents a formated signal or word block to be transmitted over channel 23-1 with parity of redundancy bits, synchronization bits, and request or no request retransmission bits (NACK or ACK respectively). RD* represents a frame of the received data, redundancy, sync and ACK or NACK bits (forming TD*) as received and RD represents the data block after separation from RD*.

RC represents the clock signal from the MODEM and RC* represents the clock rate derived therefrom but at a slower frequency.

Figure 2A:
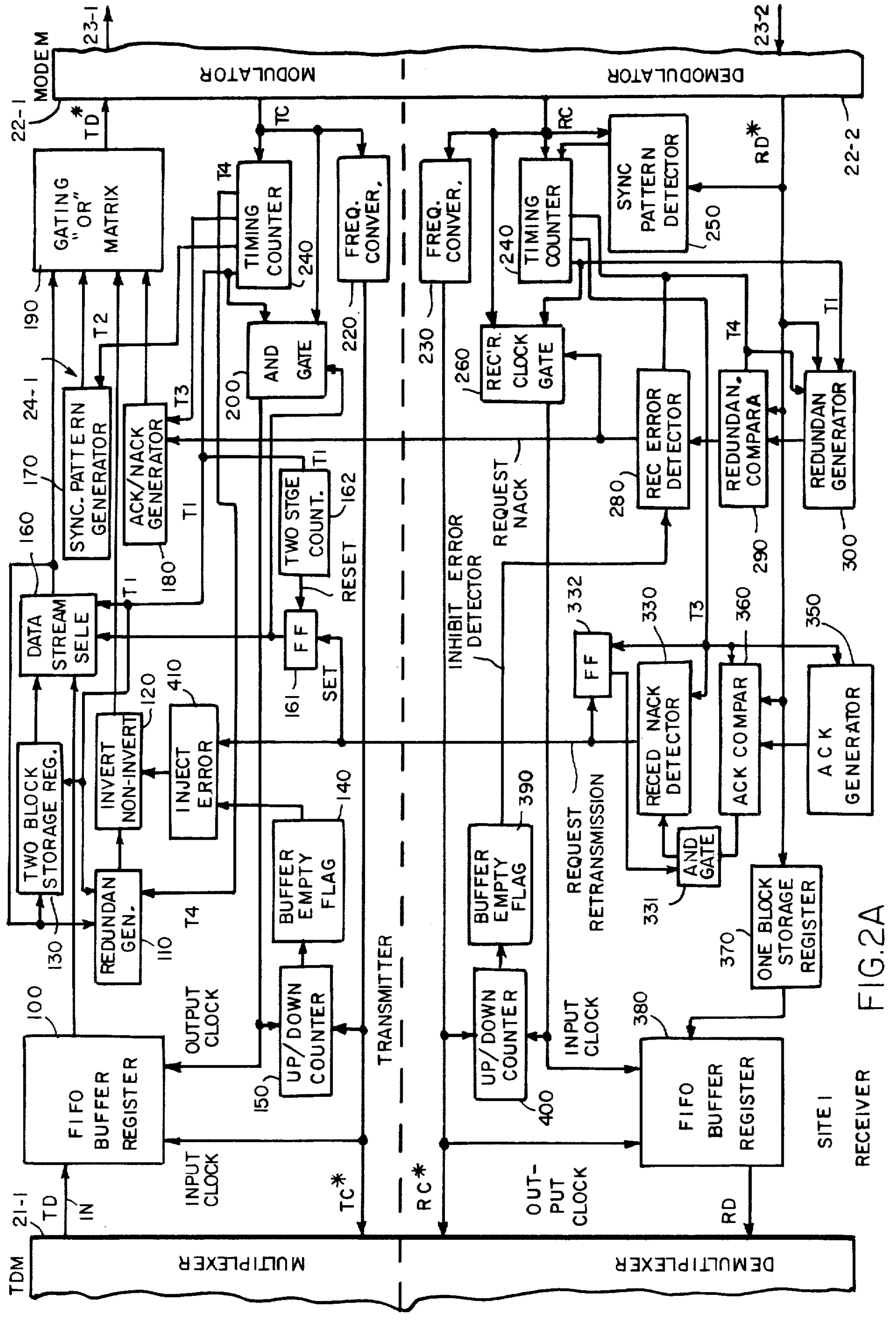
FIG. 2A and 2B are block diagrams illustrating an PFEC system in the link of FIG. 1 and having subsystems at sites 1 and 2 respectively.
Figure 2B:
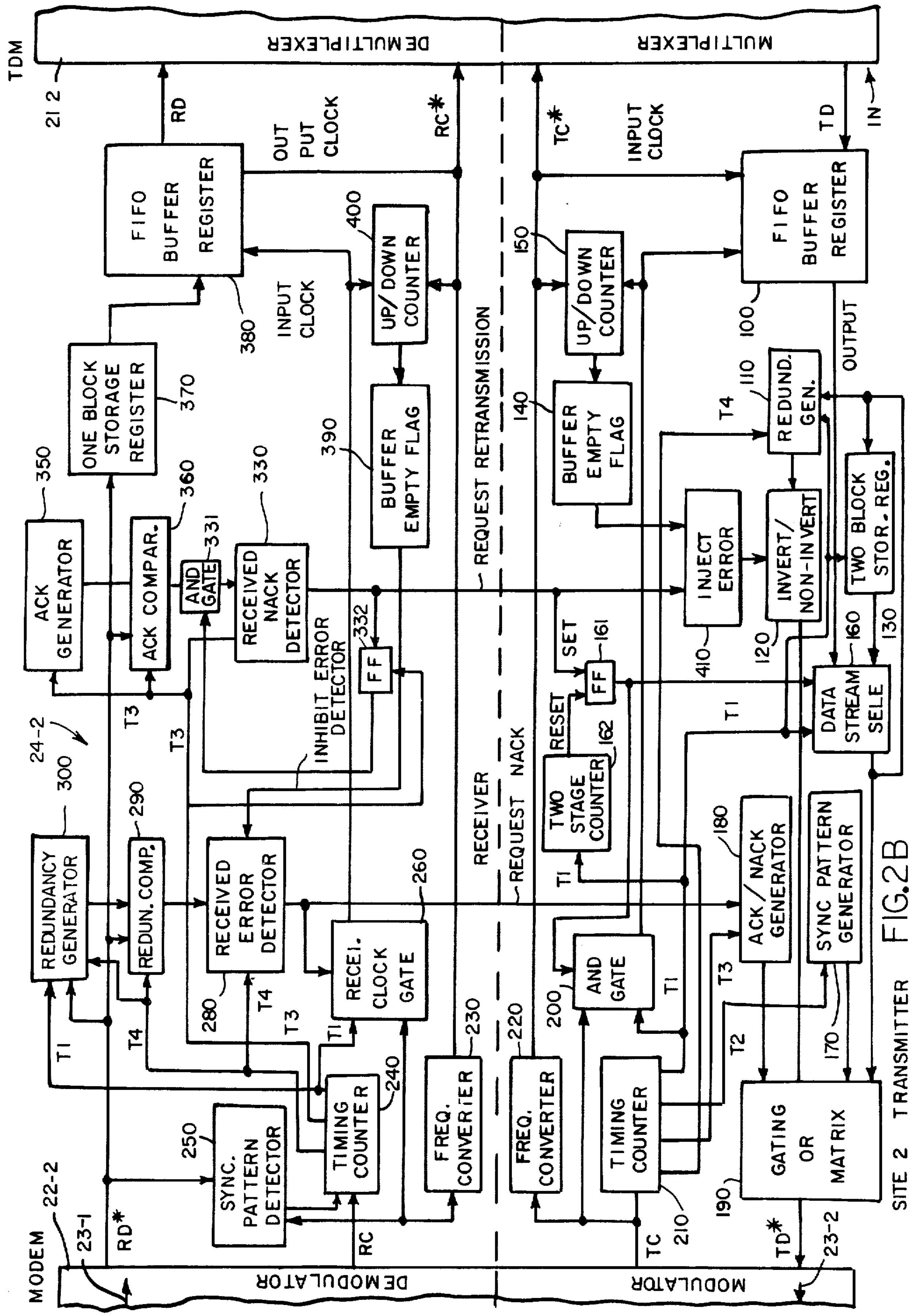

Reference should now be had to FIG. 2A and 2B as well as FIGS. 3 to 11 which illustrates in detail each of the PFEC subsystems.

At 100 there is shown an elastic memory or first-in first-out buffer register (FIFO). These devices are available in the marketplace and may for example by of the type purchaseable from Signetics of Sunnyvale, Calif., as Model 2535 (depending upon the desired buffer register size) universal asynchronous first-in first-out buffer register. The register is designed so that information entered at the input (TD) will "fall through" to the lowest unoccupied location.

The buffer functions to continuously receive data at its input and supply data at its output at different or equal rate.

Other first-in first-out buffer device configurations for handling smaller or larger data blocks are available from various other manufacturers or may be constructed by those skilled in the art using conventional Flip-flop and control circuitry.

Assuming now that a data block is available from the first-in first-out buffer 100, it is now clocked out serially in a burst as for example as a data block or word of 40 bits.

The data block is transmitted to data stream selector 160. The purpose of the data stream selector is to select whether an input from a two data block storage register 130 or the input from the FIFO is to appear at the output thereof and in this way controls the flow of data depending upon whether the encoder is or is not in the retransmission code.

As used herein each transmitter comprises an elastic memory or FIFO and an encoder, the encoder being all other devices, and as used herein each receiver comprises an elastic memory or FIFO and a decoder, the decoder being all other devices.

Figure 5:
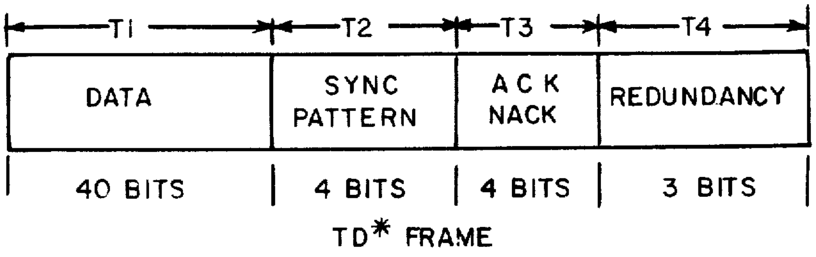
FIG. 5 illustrates a block of data bits, ACK/NACK bits, sync bits and redundancy bits.

If we assume that the encoder is not in the retransmission mode, data (TD) will be provided directly to a gating matrix or 4 way conventional "OR" gate 190 coupled directly to the MODEM 22-1 at time $T_1$ (see FIG. 5). A further description of the data stream selector will be given later in this description.

The data TD after passing through the selector is also fed directly to a redundancy or parity generator 110 which generates redundancy or parity code to be transmitted with the data from the "OR" gate 190.

Figure 3:
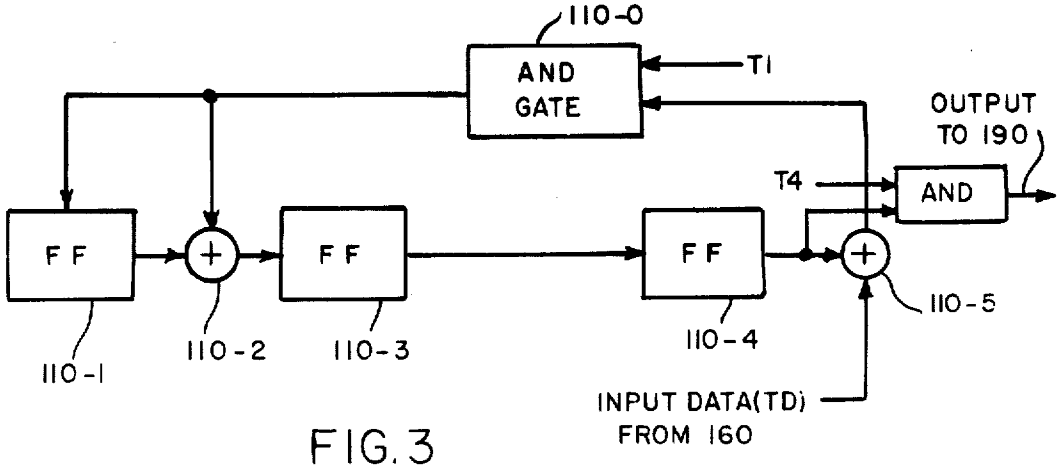
FIG. 3 is a block diagram illustrating a redundancy or parity generator.

A representation of a three bit redundancy generator suitable for the purposes of this disclosure is shown in FIG. 3 and operates according to the polynominal $g(x) - 1 + X + X^3$.

Initially all flip-flops (FF) are set to zeros and "AND" gate 110-0 is closed (enabled). AND gate 110-0 is enabled only at time $T_1$.

For purposes of explanation it is assumed that each data block comprises forty bits and are shifted one bit at a time into the generator 110 during time $T_1$.

The first bit is half added to the output of FF 110-4 and goes through "AND" gate 110-0 and is entered into FF 110-1. At the same time the output of gate 110-0 is half added with the output of FF 110-1 through exclusive "OR" gate 110-2 and entered into FF 110-3 while the output of FF 110-3 is shifted into FF 110-4.

The second and subsequent data bits are shifted into the generator in a similar fashion and so on. After all 40 data bits have been so shifted into the generator, the contents of the Flip-flops constitute the redundancy for the forty data bits.

At this time data input is no longer provided at the data gate 110-0 opened by a change in control line $T_1$ level and the Flip-flops 110-1, 110-3 and 110-4 are clocked out by clock pulses TC during $T_4$ time one bit at a time (3 bits total) which represents the redundancy for the data block.

It should be obvious to those skilled in the art that many other codes may be generated by changing the manner in which the data bits are operated upon.

If 10 parity bits are to be generated for a forty bit word, ten Flip-flops would be used and the forty data bits would be combined according to the parity bit code polynominal selected. The exact code is not crucial nor is the number of parity bits so long as sufficient parity bits are provided to effect reliable error detection.

Reference should be had to the aforementioned texts as well as the text ERROR CORRECTING CODES by Peterson, copyrighted 1961, and published by the MIT Press and John Wiley and Sons Inc., which disclose various parity bit generating schemes and methods for implementing same.

The "OR" gate 190 also receives sync bits from sync generator 170. The sync bits are provided from 3 bit conventional presettable shift register and are clocked out by TC clock signals during $T_2$ time.

Reference may be had to the aforementioned text Digital Computer Fundamentals which discloses on pages 100 and 101 a shift register. In addition, shift registers are purchasable items from companies such as Signetics.

Figure 4:
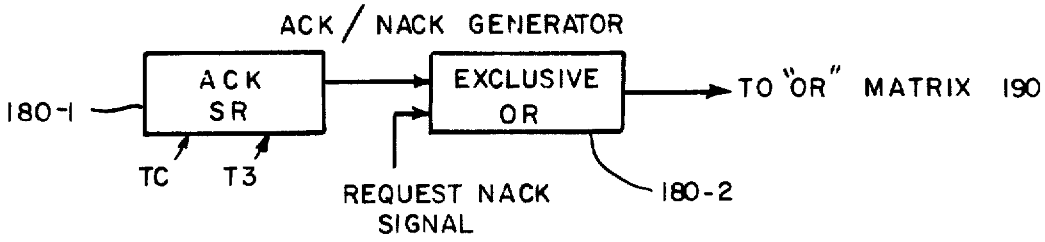
FIG. 4 illustrates an ACK/NACK Generator.

The "OR" gate 190 also receives ACK/NACK bits from ACK/NACK generator 180. The ACK/NACK generator is shown in FIG. 4 and includes presettable 4 bit shift register 180-1 coupled to an exclusive "OR" circuit 180-2. During time $T_3$, the contents of the ACK shift register are shifted out by clock TC.

The presettable shift registers are commercially available from Texas Instruments as type SN 7495 as well as from others. Other types are also commercially available. The presettable registers in the sync generator and in the ACK/NACK generator may be preset with any bit code (e.g., 1101 for ACK code and 1010 for the sync code).

The ACK/NACK generator normally supplies an ACK code except when a request "NACK" signal is provided to the exclusive or 180-2 from the decoder portion of the return data receiver at site 1 which causes the ACK code bits to be inverted (a NACK code).

Timing for the data transmitter is provided by a conventional timing counter 240 responsive to timing signals TC provided by the MODEM.

The timing clock signals TC are converted into timing level signals $T_1$, $T_2$, $T_3$, and $T_4$ by the counter 210 to control the formating of the word TD* to be transmitted from gating matrix 190 and comprising data, redundancy, ACK/NACK and sync pattern bits. For example, a word TD* may comprise as shown in FIG. 5, 51 bits with data represented by 40 bits, ACK/NACK by 4 bits, sync patterns by 4 bits and redundancy by 3 bits appearing at times $T_1$, $T_2$, $T_3$ and $T_4$.

Figure 12:
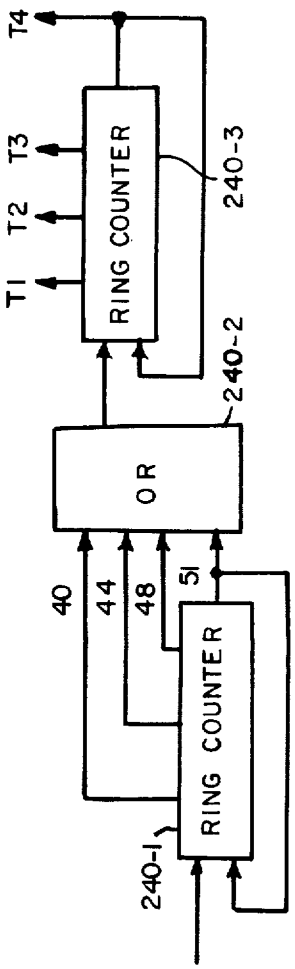
FIG. 12 illustrates an implementation for a timing counter.

A timing counter is shown in FIG. 12 and comprises ring counter 240-1 which provides output signals at bit counts 40, 44, 48 and 51 which pass through an OR circuit 240-2 and sent to a second ring counter 240-3 to provide $T_1$, $T_2$, $T_3$ and $T_4$ times or timing levels.

In addition to the above, TC clock pulses are provided to both a transmitter clock "AND" gate 200 and a frequency converter 220 to control the flow of data into and out of the first-in first-out buffer 100. In this manner data can be taken out of the buffer 100 at a higher rate than it is in inserted therein, although control means is provided to give the buffer time to fill up in the event it approaches empty as will be described.

The transmitter clock gate 200 is a three way "AND" circuit, the purpose of which is to inhibit the buffer output clock when a retransmission is taking place, thus preventing data from being extracted from the buffer 100 while stored data from a two block storage register 130 is being transmitted as will be more fully described. The clock gate 200 also inhibits clock signals to the buffer when the sync pattern, ACK/NACK and redundancy bits are transmitted at times $T_2$, $T_3$ and $T_4$ respectively, so that data is extracted only when data is to be transmitted during $T_1$ time. In the presence of a request retransmission held for two $T_1$ times through the two stage counter 162 and FF 161 "AND" gate 200 is held open or disabled until the two blocks of data are shifted out during successive $T_1$ times from the two block storage register 130.

Thus the clock gate 200 will only provide an output clock if the request retransmission signal is not present and TC and T1 timing signals are present.

Figure 6:
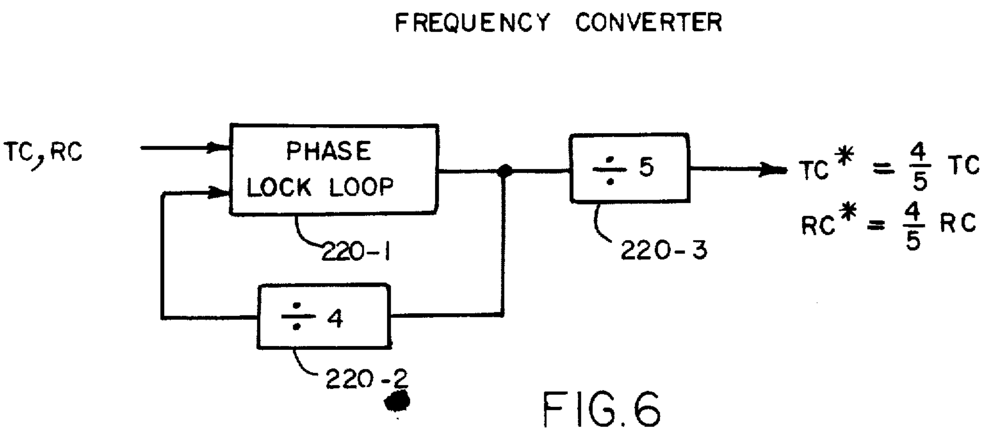
FIG. 6 illustrates in block form a frequency converter.

The frequency converter 220 may be designed as shown in FIG. 6 and provides at its output a new frequency TC* which is a fractional multiple of the input frequency TC. The free running frequency of a phase lock loop 220-1 is four times the input frequency (TC). The phase lock loop output is divided by 4 divider 220-2 and fed back to the input. The device adjusts its frequency so that it is four times the input frequency. The phase lock loop output is divided by 5 by divider 220-3 to obtain a new frequency which is four-fifths of the input frequency TC. A phase lock loop may be purchased from Harris Semiconductor, a division of Harris - Intertype Corporation as HA 2825.

The dividers may be purchased from Signetics Incorporated with the divider 220-2 selected as SN 7493 and divider 220-3 selected as SN 7490. The output of the frequency generator is used to control the entrance of data into the first-in first-out buffer 100 as well as supply a clock to the multiplexer.

If we now assume that a TC clock signal is provided and results in an output clock signal being provided to the FIFO 100 which already contains blocks of data, a first block of data A is now clocked out of the FIFO and at $T_1$ is presented to the data stream selector 160 which for the purposes of explanation is now assumed to provide block A at its output. Thus the data of block A will appear at gating "OR" 190 and be forwarded to the MODEM 22 modulator.

During time $T_3$, the ACK bits will be clocked out of ACK/NACK generator 180 since it is assumed that the request NACK signal is not present and thus will also be provided to "OR" gate 190 and be forwarded to the MODEM 22 modulator.

At time $T_2$ the sync pattern bits will be provided due to clock signal TC which clocks the bits out of the sync pattern shift register 170. At time $T_4$ the redundancy or parity bits will be clocked out of the Flip-flops 110-1, 110-3 and 110-4 and are then provided to an invert-non invert (a conventional two input exclusive "OR") 120.

Depending upon the input from the device 410 labeled inject error the redundancy bits or the inversion thereof will be provided at time $T_4$ to the "OR" gate 190 for forwarding to the MODEM 22 modulator. Since the purpose of device 410 will be set forth at a later time, it will be assumed at this time that the redundancy bits are transmitted without inversion since no inject error signal is present.

Thus frame A (see FIG. 5) is sent via modulator 22-1 and channel or line 23-1 to site 2 MODEM 22-2 demodulator. At this time, frame A is examined as follows in the data receiver (site 2) of PFEC sybsystem which comprises a decoder and a FIFO buffer register 320 of the same type as the FIFO 100.

Since the blocks in the diagrams at sites 1 and 2 are the same, the same numbers will be used where possible to indicate the same functional devices.

In order to insure that there is at least initial sync between the timing counter or clock at site 2 data receiver there is provided a conventional sync pattern detector 250. The sync pattern detector is used to cause the timing counter to start providing $T_1$, $T_2$, $T_3$ and $T_4$ timing signals at a precise time that data, ACK/NACK and redundancy bits are to appear for processing.

Figure 7:
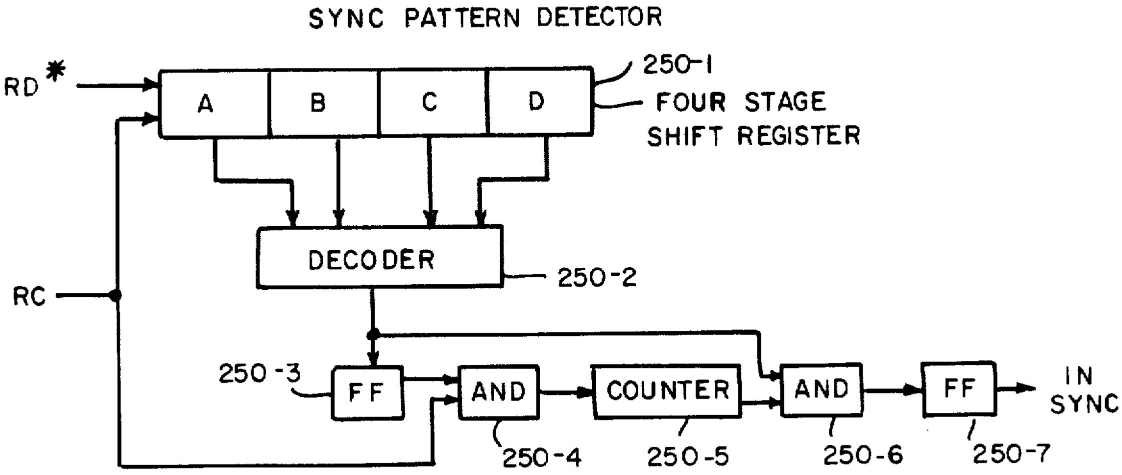
FIG. 7 illustrates in block form an initial Sync Pattern Detector.
Figure 8:
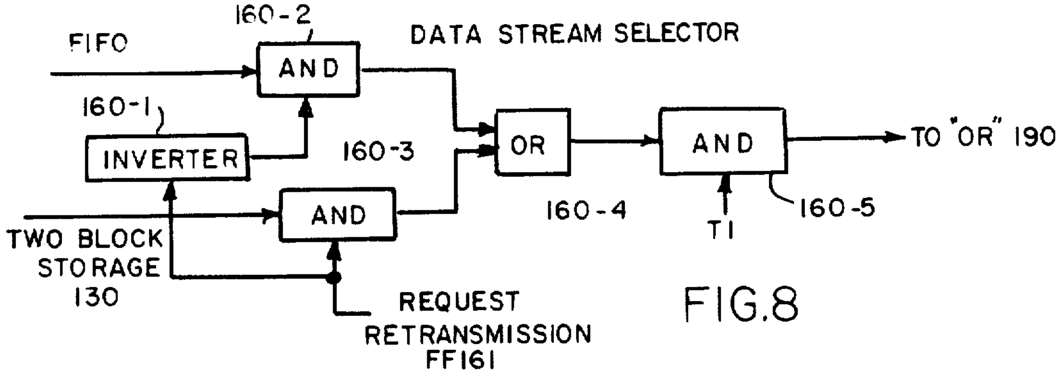
FIG. 8 illustrates in block form a data stream selector.

In FIG. 7 a suitable initial sync pattern detector is shown as comprising a four stage shift register 250-1 which acts as a window looking at an incoming bit stream. The decoder is a hard wired "AND" gate connected to only accept a bit configuration equal to the sync pattern. For example, if the sync pattern is a 1101, an output will only be provided from the decoder when the outputs from shift register stages A, B and D are 1 and the output from stage C is a 0.

In order to generate the IN sync signal to start, or permit, the timing counter 240 to begin counting, the sync pattern is detected a second time at the right separation from the first detection of sync. This is accomplished by the FF 250-3, and 250-4, counter 250-5 (counting 51 RC clock pulses) and an "AND" circuit 250-6 which sets a Flip-flop (FF) 250-7. It will thus be apparent that the second occurance of sync pattern detection by the decoder afer 51 RC clock pulses will provide an IN SYNC signal.

The "IN SYNC" is used to permit RC clock pulses to be counted to derive $T_1$, $T_2$, $T_3$ and $T_4$ times, e.g., an "AND" gate controlled thereby may be used to feed RC clock pulses to the counter.

IN SYNC is usally established by sending test signals comprising data which may be thrown away. In addition, those skilled in the art will be aware that sync may be monitored continuously by continually looking for the sync pattern. In addition, it will be obvious to those skilled in the art that other schemes could be used to obtain synchronization between transmitted and received data for processing purposes.

Since the precise means of providing sync is immaterial to an understanding of this invention it will now be assumed that the $T_1$, $T_2$, $T_3$ and $T_4$ clock times will appear at the time necessary to process the data, redundancy and ACK/NACK bits.

If we assume now that RD* is received, it will now be checked for errors. This is accomplished by a redundancy generator 300 (of the same type as redundancy generator 110) calculating the redundancy of the data bits during $T_1$ time by receiving the data bits.

Figure 9:
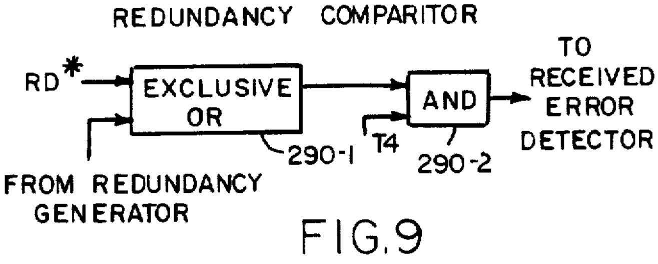
FIG. 9 illustrates in block form a redundancy comparator.

At $T_4$ time the calculated redundancy from the received data is clocked into a redundancy comparator as shown in FIG. 9 and it is compared at $T_4$ time with the received redundancy bits. If the comparison is true, (calculated redundancy bits = received redundancy bits), then the data of block A was received correctly and no request NACK signal is provided to ACK/NACK generator 180 (same as at site 1) by the received error detector (see FIG. 10). In this event the return TD* encoded frame from gating matrix 190 contains an ACK code At the same time the first data block A is stored in one block storage register 370 and at the next $T_1$ time, data block A is clocked into FIFO 380 via input clock signals RC from receiver clock gate 260. Receiver clock gate 260 is a three input "AND" gate which provides input clock signals at $T_1$ time if the input from receiver error detector 280 is not requesting a NACK signal.

Output clock singals RC* are continuously provided as shown through the frequency converter 230 (same as at site 1 and shown in FIG. 6).

When the frame from site 2 via channel 23-2 arrives at site 1, it is processed in a like manner as described for data redundancy and is also checked to determine if the return frame contains an ACK or NACK (request retransmission signal).

The ACK or NACK code is detected by the use of an ACK genrator(presettable shift register)350 which is clocked out at T3 time and compared in an ACK comparator 360 (an exclusive OR circuit). If the ACK signal is detected, then no request retransmission signal is provided from received NACK detector 330 (a resetable FF) at time $T_3$ and the next block of data B is sent with the correct redundancy.

At this time consider that encoded block A from site 1 was received incorrectly at site 2 and was detected as incorrect after a redundancy check.

In this case the redudnancy comparator 290 at site 2 will generate at $T_1$ time a signal from "AND" circuit 280-1, assuming that the inhibit error detect signal is not present, to set a Flip-flop 280-2. The Flip-flop 280-2 is reset at the next $T_4$ time. In addition the setting of the Flip-flop 280-2 prevents the receiver clock gate 260 from clocking data into FIFO 380. In this manner the ACK/NACK generator is requested to provide a NACK code in the word frame A' being transmitted from site 2 to site 1.

Upon the receipt of the NACK signal at site 1 as part of frame A' the following events occur, the NACK code is detected by making an ACK code comparison at time $T_3$ in ACK comparator 360. The detection of a NACK (the inverse of the ACK) sets the Flip-flop 330 to a 1 (thus requesting retransmission) said Flip-flop being reset at $T_3$ time.

The output of the thus set Flip-flop 330 is fed to an OR circuit labeled INJECT ERROR 410 which in turn is provided to an exclusive "OR" circuit 120 (labeled invert/non-invert). The presence of a 1 at the exclusive "OR" 120 causes the redundancy bits in frame B now being transmitted to site 2 to be made incorrect by inverting them (see FIG. 4 which shows an exclusive "OR" circuit for inverting the ACK to a NACK).

The request retransmission signal (FF 330 set to 1) also sets a FF 161 which accomplishes two things:

1. "AND" gate 200 is disabled thus preventing any more data from being pulled out of storage; and 2. It also sets the data stream selector (see FIG. 8) to provide the next two blocks of data from the two block data storage register 130 instead of from the FIFO 100.

This is accomplished by the Flip-flop 161 applying a signal (see FIG. 8) to an inverter 160-1 to apply a signal to disable "AND" gate 160-2 coupled to the FIFI 100 and also applies a signal to enable "AND" gate 160-3. In this manner data from the two block storage register 130 (which had been storing previously transmitted data blocks A and B as they were fed back into it while being transmitted at T1 time) is now permitted to pass through OR circuit 160-4 and be clocked out at $T_1$ time through "AND" circuit 160-5.

The storage registers 130 and 370 may be selected from those registers currently on the market such as Signetics 2500 series types 2527, 2528 or 2529, as will be apparent to those skilled in the art.

The data stream selector 160 continues to supply previously transmitted blocks A and B for the next two $T_1$ times at which the time FF 161 is reste by an output from two stage counter 162.

If the next returning frame B' TD* from site 2 also contains an NACK code, it will be disregarded by site 1 receiver in order to prevent injecting errors in two consecutive blocks. This is accomplished by FF 322 which is set on the detection of the first NACK CODE and disables an "AND" circuit 331 at the input to RECV. NACK detector 330. At the end of the next $T_3$ time, FF 322 is reset thus preventing a second NACK CODE detected in a row requesting retransmission.

The data portions of encoded blocks A and B are discarded if encoded block contained an error. This is accomplished by inhibiting Receiver Clock Gate 260 to the FIFO 380 as a result of receiver error detector FF 280-2 being set for the duration of two frames. The one block storage register 370 permits discarding of an erroneous data block before it enters FIFO 380.

Since at site 1 detection of a second NACK code in a row is prevented the redundancy for the data block A from SR 130 (now being transmitted) is not inverted and is sent out correctly. If it is now received without error at site 2, then an ACK message is returned to site 1 with block C' and thus also permits data block B from SR 130 (now being retransmitted) to be sent to site 2 with correct redundancy.

If C' frame from site 2 contains a NACK code resulting from the retransmitted A block containing an error then the process repeats itself as per the decoder and encoder algorithms.

If retransmitted A and B data blocks from SR 130 as well as their parity bits are received correctly at site 2, then the data stream selector switches to again permit data blocks to be pulled out of FIFO 100. If retransmitted A and B data blocks are detected as in error, then the process of sending NACK codes begins once again to request retransmission.

Redundancy bits for retransmitted data blocks A and B are derived in the same manner as for all other data blocks.

Under very low line error conditions FIFO 100 will empty more quickly than data is being supplied to it. In such a case FIFO 100 is permitted to be refilled by intentionally inserting or injecting an error in data blocks being transmitted, thus intentionally causing retransmission.

To accomplish the above an up-down counter 150 is coupled to the intput and output clock lines to FIFO 100 and provides an output signal when the number of data blocks in the FIFO falls below a certain number.

By assuming that FIFO 100 is initially full then the measure of clock-in and clock-out pulses to the FIFO 100 will indicate the number of blocks of data remaining in the FIFO. This is accomplished by an up-down counter 150 which may be purchased from various suppliers such as Texas Instruments, Signetics, etc., and may be a commonly available SN 74193 type of counter.

The signal from the counter 150 is applied to a buffer empty flag 140 (see FIG. 11) to set a Flip-flop 140-1. The setting of the Flip-flop 140-1 provides a signal through OR circuit 410 (inject error block) to cause inversion of the transmitted redundancy bits by invert/non-invert exclusive "OR" block 120 thus causing the flow of a NACK signal back from site 2 and retransmission to occur and giving the FIFO 100 time to fill up.

Since the output clock gate 200 is disabled during retransmission, FIFO 100 is permitted to fill and the up-down counter reaches a state wherein the counter output changes its states, e.g., goes from a 1 to an 0 and this causes FF 140-1 to be reset through inverter 140-2. At this time errors are no longer injected into the redundancy bits.

In cases where there are a large number of data errors, the FIFO's 380 in the receiver (site 1 and site 2) will empty too quickly, and there will be insufficient data to be supplied to the TDM. In order to prevent this from occuring, there is provided an up-down counter 400 of the aforementioned type which determines that there is an insufficient number of data blocks remaining in the FIFO 380.

Figure 11:
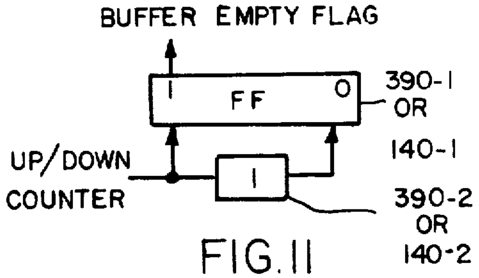
FIG. 11 illustrates a buffer empty flag device.
Figure 10:
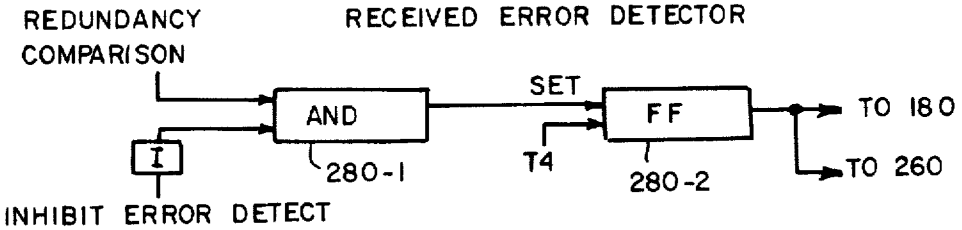
FIG. 10 illustrates in block form a received error detector.

Again this is accomplished by counting input and output clock pulses and then setting a Flip-flop 390-1 of a buffer empty flag 390 (see FIG. 11). The setting of Flip-flop 390-1 to a 1 in this case passes through an inverter at the input to "AND" 280-1 (see FIG. 10) of received error detector 280 and prevents request NACK signals from being sent back to request retransmission. Thus FIFO 380 is permitted to refill with data even if the data is in part erroneous. When the up-down counter indicates that there is sufficient data stored in FIFO 380, at this time FF 390-1 through inverter 390-2 is reset and no longer inhibits NACK request signals.

As used herein errors may be injected in the redundancy bits by inverting only one bit instead of all the bits although the latter is preferred. Errors may also be injected by inverting data.

It should be understood by those skilled in the art that RC and TC clock pulses are supplied to all those shift registers, counters, Flip-flops, etc., which utilize clock pulses for operation.

We claim:

1. In an error correction subsystem, first means for generating redundancy signals based on blocks of data signals to be transmitted, second means for injecting an error into said signals, and in which said second means for injecting an error inverts the redundancy signals.

2. In an error correction subsystem, first means for generating redundancy signals based on blocks of data to be transmitted, second means for injecting an error into said redundancy signals, third means for recognizing a received request retransmission signal and controlling the injection of an error into said redundancy signals, means for transmitting blocks of data previously transmitted upon recognition of a received request retransmission signal, and first in first out storage means for storing blocks of data to be transmitted.

3. In an error correction subsystem according to claim 2 in which first in first out storage means receives blocks of data at its input at a slower rate than it provides blocks of data at its output.

4. In an error correction sybsystem according to claim 3 in which means is provided for monitoring the number of blocks of data in said first in first out storage means to provide a control signal to said second means in the event the number of blocks of data in said first in first out storage means falls below a predetermined number.

5. In an error correction subsystem according to claim 4 including timing means as a part of the subsystem for generating a pair of clock signals for said first in first out storage means, one clock signal at a slower rate than the other.

6. In an error correction subsystem according to claim 2 wherein said subsystem includes means for preventing the output of a block of data from said first in first out storage means after receipt of a request retransmission signal.

7. In an error correction subsystem according to claim 2 wherein said subsystem includes selector means for providing either previously transmitted blocks of data or blocks of data to be transmitted to said first means.

8. In an error correction subsystem according to claim 2 wherein said subsystem includes a first storage means which is responsive to the detection of a request retransmission signal to cause blocks of data in said first storage means to be transmitted prior to additional data from said first in first out storage means being transmitted.

9. In an error correction subsystem, first means for generating the redundancy signals from the received block of data, second means for comparing received redundancy signals sent with said data block and said generated redundancy signals to generate a comparison signal which indicates if the data is correct or incorrect, first storage means for storing received data, third means for inhibiting error comparison in the event that the number of blocks of data in said first storage means falls below a predetermined number.

10. An error correction system comprising a data source at site 1, first means for transmitting blocks of data bits and redundancy bits to site 2, first means at site 2 for receiving said data bits and said redundancy bits, second means at site 2 for deriving redundancy bits from said data, third means for comparing said received redundancy bits with said derived redundancy bits and providing a request retransmission signal in the event said derived and received redundancy signals do not agree, fourth means for transmitting said request retransmission signal to said site 1, second means at site 1 for detecting said request retransmission signal, third means at site 1 for response to said request retransmission signal for injecting an error into transmitted redundancy bits, in which an error is injected into said redundancy bits by inverting one or more of said bits, including means at site 1 for retransmitting two blocks of data bits previously transmitted, and including means at site 1 for allowing the transmission of data from the data source to a storage means at site 1 storing same at site 1 for transmission while the two blocks of data bits previously transmitted are being retransmitted.

11. A method of correcting errors in data which comprises the steps of transmitting a block of data and redundancy bits, receiving said block of data and redundancy bits, recalculating the redundancy bits for said received data and comparing said received redundancy bits and recalculated redundancy bits, generating a request or no request retransmission signal based on the comparison of said received and recalculated redundancy bits which indicates if the block of data bits is correct and the step of storing the block of data bits to be transmitted at a slower rate than the rate at which the block of data bits are pulled out of storage for transmitting.

12. A method of correcting errors in data which comprise the steps of transmitting a block of data and redundancy bits, receiving said block of data and redundancy bits, recalculating the redundancy bits for said received data and comparing said received redundancy bits and said recalculated redundancy bits, generating a request or no request retransmission signals based on the comparison of said received and recalculated redundancy bits which indicates if the block of data bits is correct, storing the blocks of data bits to be transmitted at a slower rate than the rate at which the blocks of data bits are pulled out of storage, and detecting the number of blocks of received data tibs held within storage and injecting an error into said block of bits transmitted if the number of blocks of data in storage reaches a predetermined number.

13. A method of correcting errors in data which comprise the steps of transmitting a block of data and redundancy bits, receiving said block of data and redundancy bits, recalculating the redundancy bits for said received data and comparing said received redundancy bits and said recalculated redundancy bits, generating a request or no request retransmission signals based on the comparison of said received and recalculated redundancy bits which indicates if the block of data bits is correct, detecting said request retransmission signal and injecting an error into the redundancy bits of the next block of data and redundancy bits to be transmitted and storing the blocks of received data and preventing the detection of an error in the redundancy bits received with said received blocks of data in the event the number of blocks of stored data falls below a predetermined number.

* * * * *